US012663628B2

(12) United States Patent
Le et al.

(10) Patent No.: US 12,663,628 B2
(45) Date of Patent: Jun. 23, 2026

(54) OPTICAL SYSTEM

(71) Applicant: 3M INNOVATIVE PROPERTIES COMPANY, St. Paul, MN (US)

(72) Inventors: John D. Le, Woodbury, MN (US); Timothy L. Wong, West St. Paul, MN (US); Bing Hao, Woodbury, MN (US); Gregg A. Ambur, San Clemente, CA (US); Susan L. Kent, Shorewood, MN (US)

(73) Assignee: 3M INNOVATIVE PROPERTIES COMPNAY, St. Paul, MN (US)

( * ) Notice: Subject to any disclaimer, the term of this patent is extended or adjusted under 35 U.S.C. 154(b) by 259 days.

(21) Appl. No.: 18/554,658

(22) PCT Filed: Apr. 5, 2022

(86) PCT No.: PCT/IB2022/053176
§ 371 (c)(1),
(2) Date: Oct. 10, 2023

(87) PCT Pub. No.: WO2022/229749
PCT Pub. Date: Nov. 3, 2022

(65) Prior Publication Data
US 2024/0219697 A1     Jul. 4, 2024

Related U.S. Application Data

(60) Provisional application No. 63/181,451, filed on Apr. 29, 2021.

(51) Int. Cl.
G02B 17/08     (2006.01)
G02B 1/04     (2006.01)
(Continued)

(52) U.S. Cl.
CPC ......... G02B 17/0856 (2013.01); G02B 1/041 (2013.01); G02B 5/10 (2013.01);
(Continued)

(58) Field of Classification Search
CPC ................................................. G02B 17/0856
See application file for complete search history.

(56) References Cited

U.S. PATENT DOCUMENTS

| | | | |
|---|---|---|---|
| 5,882,774 A | 3/1999 | Jonza et al. | |
| 6,179,948 B1 | 1/2001 | Merrill et al. | |

(Continued)

FOREIGN PATENT DOCUMENTS

| | | |
|---|---|---|
| WO | 2019079033 A1 | 4/2019 |

OTHER PUBLICATIONS

Frisen, "Optical and Neural Resolution in Peripheral Vision", 1975, Investigative Ophthalmology & Visual Science, vol. 14, No. 7, pp. 528-536.
(Continued)

*Primary Examiner* — Edmond C Lau
(74) *Attorney, Agent, or Firm* — Clifton F. Richardson

(57) ABSTRACT

An optical system includes an optical cavity defined by a reflective polarizer and a partial reflector. The optical cavity includes one or more optical components including a first optical lens spaced apart from the reflective polarizer. Each optical component within the optical cavity has a substantially uniform retardance or a maximum retardance of less than about 10 nm. The optical system includes a second optical lens disposed outside the optical cavity. The reflective polarizer is disposed on and conforms to a major surface of the second optical lens. The second optical lens has a substantially nonuniform retardance and a maximum retardance in a largest active region of the second optical lens of greater than about 12 nm.

20 Claims, 18 Drawing Sheets

(51) Int. Cl.

| | | |
|---|---|---|
| *G02B 5/10* | (2006.01) | |
| *G02B 5/30* | (2006.01) | |
| *G02B 27/01* | (2006.01) | |

(52) U.S. Cl.

CPC ......... *G02B 5/3033* (2013.01); *G02B 5/3083* (2013.01); *G02B 27/0172* (2013.01)

(56) References Cited

U.S. PATENT DOCUMENTS

| | | | |
|---|---|---|---|
| 6,300,991 B1 | 10/2001 | Schadt et al. | |
| 6,783,349 B2 | 8/2004 | Neavin et al. | |
| 6,916,440 B2 | 7/2005 | Jackson et al. | |
| 6,967,778 B1 | 11/2005 | Wheatley et al. | |
| 9,162,406 B2 | 10/2015 | Neavin et al. | |
| 10,678,052 B2 | 6/2020 | Ouderkirk et al. | |
| 2002/0180916 A1 | 12/2002 | Schadt et al. | |
| 2003/0028048 A1 | 2/2003 | Cherkaoui et al. | |
| 2005/0072959 A1 | 4/2005 | Moia et al. | |
| 2006/0197068 A1 | 9/2006 | Schadt et al. | |
| 2007/0273970 A1* | 11/2007 | Hoppe ................... | G02B 27/28 |
| | | | 359/489.18 |
| 2018/0039052 A1 | 2/2018 | Khan et al. | |
| 2019/0384045 A1 | 12/2019 | Yun et al. | |
| 2020/0081234 A1 | 3/2020 | Etter et al. | |
| 2020/0192079 A1 | 6/2020 | Tohara et al. | |
| 2020/0379226 A1 | 12/2020 | Steiner et al. | |

OTHER PUBLICATIONS

International Search Report received for PCT International Application No. PCT/IB2022/053176, mailed on Jun. 14, 2022, 3 pages.

Mccarthy, "Quantitative Evaluation of Human Visual Perception for Multiple Screens and Multiple Codecs", 2013, SMPTE Motion Imaging Journal, vol. 122, No. 4, pp. 36-42.

Tamron's Foshan Factory, "Production Process of a Tamron", 2012., Guidebook on Digital Single Lens Cameras, with Professional Solutions, 19 pages.

Tan, "Foveated Imaging for Near-Eye Displays", 2018, Optics Express, vol. 26, No. 19, pp. 25076-25085.

Wong, "Folded Optics with Birefringent Reflective Polarizers", 2017, Digital Optical Technologies, Proceedings of SPIE, vol. 10524, pp. 103350E-1-103350E-7, XP060092164.

Geng, "Viewing Optics for Immersive Near-Eye Displays: Pupil Swim/Size and Weight/Stray Light", 2018, Digital Optics for Immersive Displays, 17 pages.

Parikh, "40-1: Invited Paper: Next Generation Virtual Reality Displays: Challenges and Opportunities", 2018, SID Symposium Digest of Technical Papers, vol. 49, No. 1, pp. 502-505.

* cited by examiner 5.00

0.02

OPTICAL SYSTEM

CROSS REFERENCE TO RELATED APPLICATIONS

This application is a national stage filing under 35 U.S.C. 371 of PCT/IB2022/053176, filed Apr. 5, 2022, which claims the benefit of U.S. Application No. 63/181,451, filed Apr. 29, 2021, the disclosures of which are incorporated by reference in their entireties herein.

BACKGROUND

Many displays, including virtual reality (VR) displays, attempt to present realistic images that replicate a real or imaginary environment. In some applications, VR displays attempt to provide immersive simulation of a three-dimensional environment.

SUMMARY

The present description relates generally to optical systems that include a partial reflector and a reflective polarizer spaced apart from the partial reflector. The optical system can include a first optical lens having a lower optical retardance disposed between the partial reflector and the reflective polarizer and a second optical lens having a higher optical retardance disposed with the reflective polarizer between the first and second optical lenses. The optical system may be adapted for use in a virtual reality display, for example.

In some aspects of the present description, an optical system is provided. The optical system can include an optical cavity defined by a reflective polarizer and a partial reflector. The reflective polarizer substantially reflects light having a first polarization state in a predetermined wavelength range and substantially transmitting light having an orthogonal second polarization state in the predetermined wavelength range. The partial reflector has an average optical reflectance of at least 20% in the predetermined wavelength range. The optical cavity includes one or more optical components including a first optical lens spaced apart from the reflective polarizer. Each optical component within the optical cavity can have a substantially uniform retardance or a maximum retardance of less than about 10 nm. The optical system includes a second optical lens disposed outside the optical cavity. The reflective polarizer is disposed on and conforms to a major surface of the second optical lens. The second optical lens can have a substantially nonuniform retardance and has a maximum retardance in a largest active region of the second optical lens of greater than about 12 nm. The second optical lens is configured to face a display.

In some aspects of the present description, an optical system is provided. The optical system includes first and second optical lenses. The first optical lens has a first major surface facing the second optical lens and an opposite second major surface. The second optical lens has a first major surface and an opposite second major surface facing and concave towards the first optical lens. The first and second optical lenses have respective first and second maximum retardances in largest active regions of the respective first and second optical lenses. The first maximum retardance can be less than about 10 nm, and the second maximum retardance can be at least about 2 nm greater than the first maximum retardance. The optical system includes a reflective polarizer disposed on and conforming to the second major surface of the second optical lens and a partial reflector disposed on the second major surface of the first optical lens. The reflective polarizer substantially reflects light having a first polarization state in a predetermined wavelength range and substantially transmits light having an orthogonal second polarization state in the predetermined wavelength range. The partial reflector has an average optical reflectance of at least 20% in the predetermined wavelength range.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some embodiments of the present description, an optical system includes a partial reflector and a reflective polarizer where a first optical lens is disposed between the partial reflector and the reflective polarizer and a second optical lens is disposed such that the reflective polarizer is between the partial reflector and the second optical lens. The optical system can include a display (e.g., a liquid crystal display (LCD), an organic light emitting diode (OLED) display, or a micro light emitting diode (microLED) display) with the second optical lens 120 facing the display. The optical system may be used in a head mounted display such as a virtual reality (VR) display, for example. An optical cavity generally refers to a region between reflective or partially reflective surfaces and so the region between the partial reflector and the reflective polarizer may be referred to as an optical cavity. It is typically desired that any optical component disposed in the optical cavity have a low retardance and/or a uniform retardance. An optical component with a suitably low retardance will not substantially affect the polarization state of light in the optical cavity. An optical component with a substantial (e.g., quarter wave) retardance that is substantially uniform can be used to alter the polarization state in a desired manner. If an optical component with a high and nonuniform retardance were placed in the optical cavity, it could substantially alter the polarization state of light in the optical cavity in undesired ways. This can lead to undesired light leakage and/or ghost images, for example. Since the second optical lens is disposed outside the region between the partial reflector and the reflective polarizer, the second optical lens may have a high and/or nonuniform retardance while providing a desired optical power (e.g., an optical power greater than about 1 diopter) and still allowing the optical system to achieve desired optical properties (e.g., such that the optical system is suitable for use in a VR display). Allowing the second optical lens to have a high and/or nonuniform retardance allows a wider range of materials to be used than conventionally used in optical lenses. This can allow for different (e.g., thinner) lens geometries (e.g., due to using a lens material with a higher refractive index than conventional optical polymers) and/or reduced costs (e.g., due to using a material less expensive than conventional optical polymers).

Figure 1:
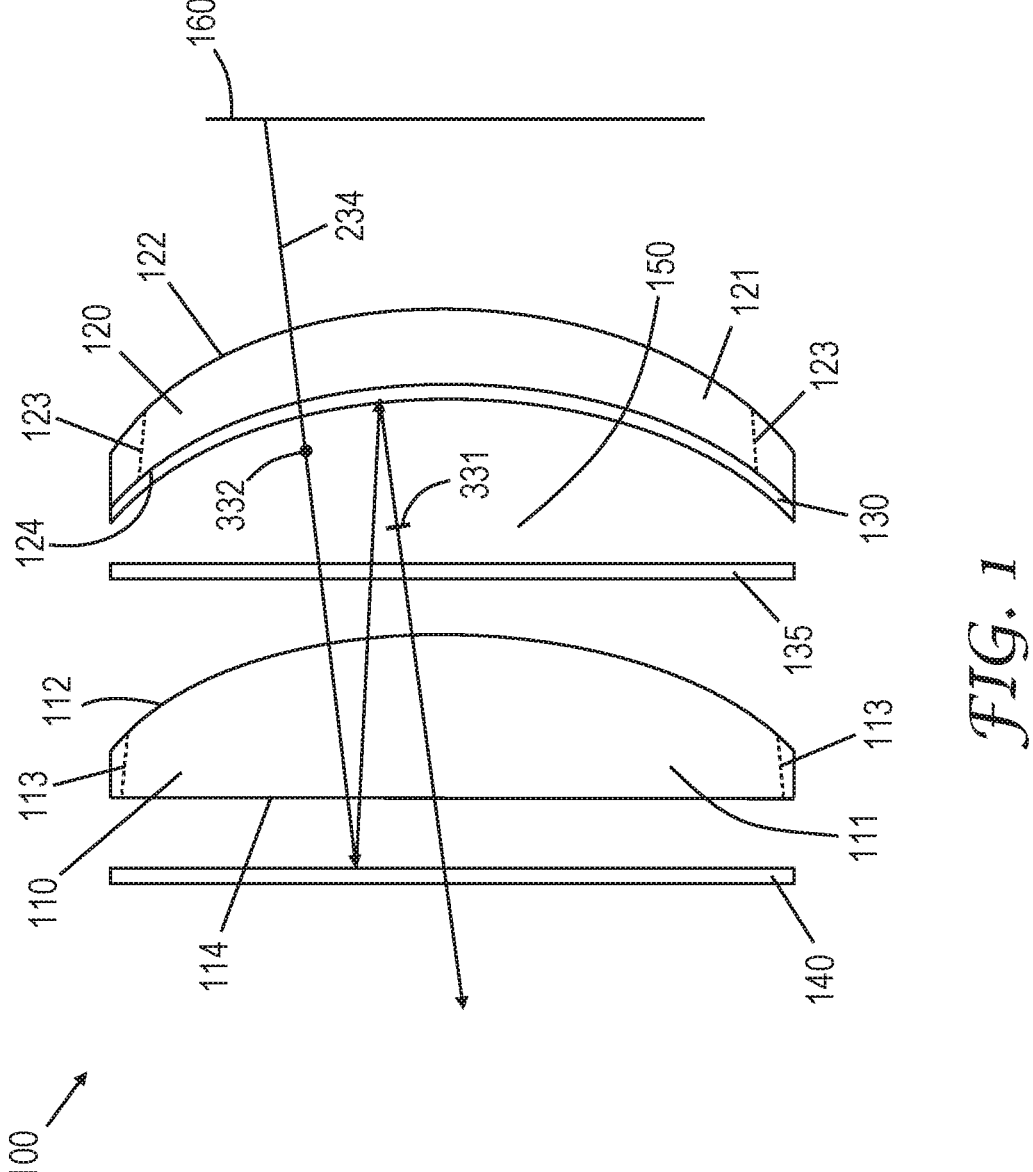
FIGS. 1-3 are schematic cross-sectional views of optical systems, according to some embodiments.

FIG. 1 is a schematic cross-sectional view of an optical system 100, according to some embodiments. The optical system 100 can include an optical cavity 150 defined by a reflective polarizer 130 and a partial reflector 140. A light 234 from a display 160 is schematically illustrated. As described further elsewhere herein, the reflective polarizer 130 substantially reflects light having a first polarization state 331 in a predetermined wavelength range (e.g., 400 nm to 700 nm, or 420 nm to 680 nm, or 450 nm to 650 nm, or a range including spaced apart red, green and blue ranges as described in U.S. Pat. No. 10,678,052 (Ouderkirk et al.), for example) and substantially transmits light having an orthogonal second polarization state 332 in the predetermined wavelength range. The partial reflector 140 has an average optical reflectance of at least 20% in the predetermined wavelength range. The average optical reflectance may be at least 30% and/or may be no more than 80% or no more than 70%, for example. The light 234 may be described as having a folded optical path. The display may emit light in the second polarization state 332 (e.g., the display may include a linear polarizer having a pass axis aligned with the second polarization state 332).

In the illustrated embodiment, the optical system 100 includes first and second optical lenses 110 and 120. In some embodiments, no optical lenses are disposed between the first and second optical lenses 110 and 120. The optical cavity 150 in the illustrated embodiment is the region between the reflective polarizer 130 and the partial reflector 140. In some embodiments, the optical cavity 150 includes one or more optical components (e.g., 110, 135) including a first optical lens 110 spaced apart from the reflective polarizer 130 where each optical component within the optical cavity 150 has a substantially uniform retardance (e.g., a retarder can have a substantially uniform retardance) or a maximum retardance of less than about 10 nm (e.g., a glass lens can have a maximum retardance of less than about 10 nm, or less than about 8 nm, or less than about 6 nm, or less than about 5 nm). In some embodiments, the optical system 100 further includes a second optical lens 120 disposed outside the optical cavity 150 where the reflective polarizer 130 is disposed on and conforms to a major surface 124 of the second optical lens 120. In some embodiments, the second optical lens 120 has a substantially nonuniform retardance and a maximum retardance (e.g., corresponding to RP2 depicted in FIG. 5) in a largest active region 121 of the second optical lens 120 of greater than about 12 nm or the maximum retardance can be in any range described elsewhere herein (e.g., an injection molded lens can have substantially nonuniform retardance and a maximum retardance of greater than about 12 nm or in a range described elsewhere). The second optical lens 120 can be configured to face a display 160.

FIG. 1 schematically illustrates boundaries 113 and 123 between respective largest active regions 111 and 121 and nonactive regions of the respective optical lenses 110 and 120. Active regions of an optical lens refer to regions that are used optically in the optical system, and nonactive regions refer to regions (e.g., near an edge of the lenses) that are not used optically in the optical system. In some embodiments, the active region of an optical lens makes up at least about 80%, or at least about 90%, or at least about 95% of a total volume of the optical lens. In some embodiments, the active region of an optical lens is all of the optical lens except a region in a periphery of the optical lens that is not used optically in the optical system.

Figure 2:
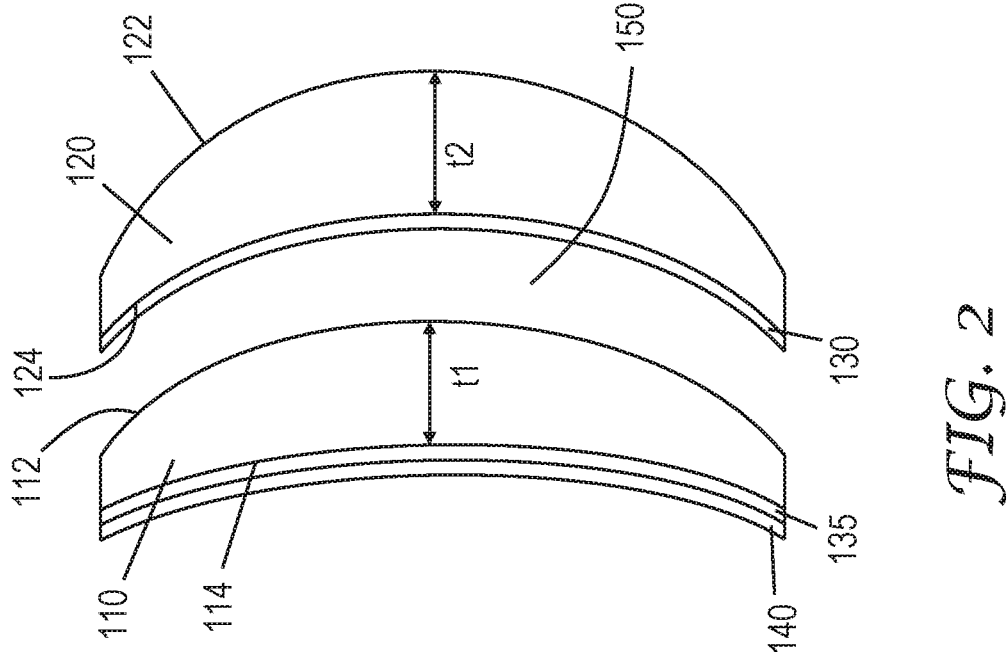
Figure 2:
Figure 3:
Figure 3:
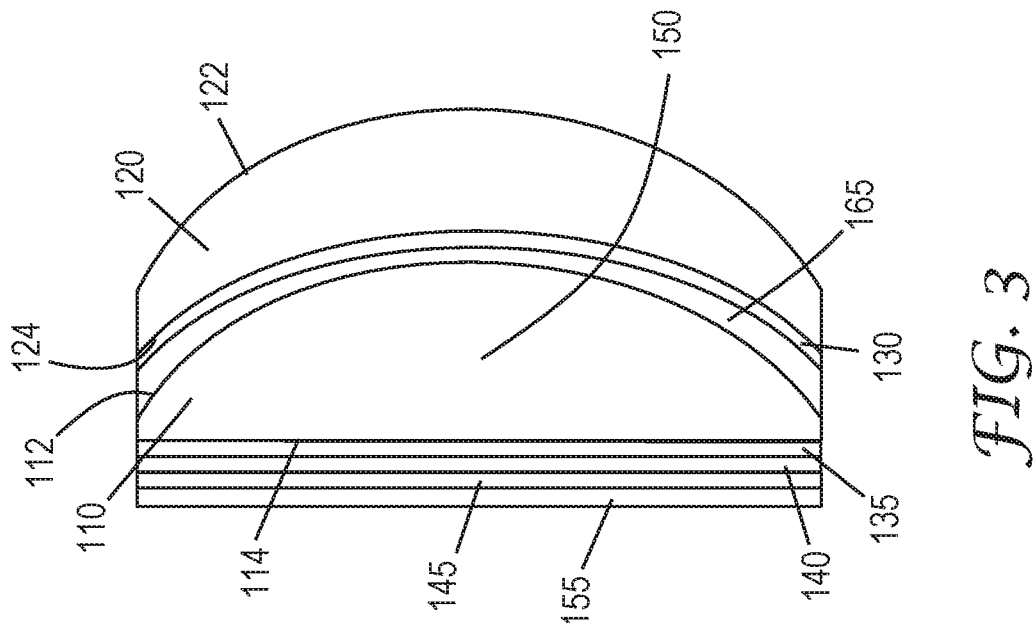

The optical system 100 may further include at least one retarder such as retarder 135. The retarder 135 may be disposed in any suitable location between the reflective polarizer 130 and the partial reflector 140. For example, the retarder 135 can be disposed between the first optical lens 110 and the reflective polarizer 130 as schematically illustrated in FIG. 1, or the retarder 135 can be disposed between the partial reflector and the first optical lens 110 as schematically illustrated in FIGS. 2-3. In some embodiments, a retarder 135 is disposed on, and may conform to, the second major surface 114 of the first optical lens 110. In embodiments where an optical cavity 150 defined by the reflective polarizer 130 and the partial reflector 140 includes one or more optical components, the one or more optical components can include the retarder 135 which may be disposed on a major surface (e.g., second major surface 114) of the first optical lens 110 and/or which may be disposed between the partial reflector 140 and the first optical lens 110.

The retarder 135 (and/or the retarder 145 depicted in FIG. 3) can be a quarter wave retarder for at least one wavelength in the predetermined wavelength range. Alternatively, the retarder may have a retardance of 5/4 or 9/4, for example, of a wavelength in the predetermined wavelength range. The retarder(s) used in the optical systems of the present description can be films or coatings or a combination of films and coating. Suitable films include birefringent polymer film retarders such as those available from Meadowlark Optics (Frederick, CO), for example. Suitable coatings for forming a retarder layer include the linear photopolymerizable polymer (LPP) materials and the liquid crystal polymer (LCP) materials described in U.S. Pat. App. Pub. Nos. 2002/0180916 (Schadt et al.), 2003/028048 (Cherkaoui et al.), 2005/0072959 (Moia et al.) and 2006/0197068 (Schadt et al.), and in U.S. Pat. No. 6,300,991 (Schadt et al.). Suitable LPP materials include ROP-131 EXP 306 LPP and suitable LCP materials include ROF-5185 EXP 410 LCP, both available from ROLIC Technologies Ltd. (Allschwil, Switzerland). Other useful retarders are described in U.S. Pat. Appl. Pub. No. 2020/0379226 (Steiner et al.), for example.

FIG. 2 is a schematic cross-sectional view of an optical system 100', according to some embodiments. Optical system 100' generally corresponds to optical system 100 except for the shape of the optical lenses (e.g., the first optical lens 110 is plano-convex in optical system 100 and is a positive meniscus lens in optical system 100'), and the retarder 135 is disposed between the partial reflector 140 and the first optical lens 110 in optical system 100'. In optical system 100', the retarder is disposed on the second major surface 114 of the first optical lens 110. The optical lenses 110 and 120 can generally have any suitable shape including, for example, biconvex, plano-convex, positive meniscus, negative meniscus, plano-convex, or biconcave. The partial reflector 140 may be disposed on the second major surface 114 of the first optical lens 110 and may conform to the second major surface 114.

In some embodiments, the first optical lens 110 has a maximum thickness t1 less than about 2 cm, or less than about 1.5 cm, or less than about 1 cm. In some such embodiments, or in other embodiments, the maximum thickness t1 is at least about 0.3 cm. In some embodiments, the second optical lens 120 has a maximum thickness t2 less than about 2 cm, or less than about 1.5 cm, or less than about 1 cm. In some such embodiments, or in other embodiments, the maximum thickness t2 is at least about 0.3 cm. The maximum thicknesses t1 and t2 can be about the same, t1 can be larger than t2, or t2 can be larger than t1. In some embodiments, the maximum thickness t1 is selected, in part, to limit or reduce the retardance of the first optical lens 110. In some such embodiments, or in other embodiments, the maximum thickness t2 is greater than the maximum thickness t1.

The optical systems 100, 100' may further include a second retarder in addition to retarder 135, which may be referred to as a first retarder, and may further include an absorbing linear polarizer. FIG. 3 is a schematic cross-sectional view of an optical system 100" that generally corresponds to optical systems 100 and 100' except for the shapes of the optical lenses, the location of the retarder 135, and the inclusion of additional elements 145, 155, and 165. In some embodiments, the optical system 100" includes an absorbing linear polarizer 155 where the partial reflector 140 is disposed between the absorbing linear polarizer 155 and the second major surface 114 of the first optical lens 110. The optical system 100" further includes a retarder 145, which may be referred to as a second retarder, disposed between the absorbing linear polarizer 155 and the partial reflector 140. The absorbing linear polarizer 155 may be included to so that only one polarization state is transmitted. For example, block light that is transmitted by the partial reflector 140 without having been previous reflected by the partial reflector 140 can be blocked by the absorbing linear polarizer 155. The absorbing linear polarizer may also help to block light leakage from multiple reflections from the reflective polarizer and partial reflector, The absorbing linear polarizer 155 may have a pass axis substantially parallel to the second polarization state 332 (e.g., the fast axes of the first and second retarders 135 and 145 may be substantially parallel so that the light 234 (see, e.g., FIG. 1), after reflecting from the reflective polarizer 130, is incident on the absorbing linear polarizer 155 substantially in the second polarization state 332), or the absorbing linear polarizer 155 may have a pass axis substantially orthogonal to the second polarization state 332 (e.g., the fast axes of the first and second retarders 135 and 145 may be substantially orthogonal so that the light 234, after reflecting from the reflective polarizer 130, is incident on the absorbing linear polarizer 155 substantially in the first polarization state 331).

In some embodiments, as schematically illustrated in FIG. 3, the optical system 100, 100', 100" includes a layer 165 disposed between the first major surface 112 of the optical lens 110 and the reflective polarizer 130. The layer 165 may be an adhesive layer and/or an index matching layer.

In some embodiments, the first and second optical lenses 110 and 120 are bonded to one another through an adhesive layer 165 disposed between the first major surface 112 of the first optical lens 110 and the reflective polarizer 130. The adhesive may be a thermal or radiation (e.g., ultraviolet) cured adhesive, a hot melt adhesive, or a pressure sensitive adhesive, for example.

In some embodiments, the optical system 100" includes an index matching layer 165 disposed between the first major surface 112 of the first optical lens 110 and the reflective polarizer 130 where the index matching layer 165 has a refractive index between a refractive index of the first optical lens 110 and a refractive index of the reflective polarizer 130. The refractive index of the reflective polarizer 130 can be the refractive index of an outermost layer of the reflective polarizer 130 facing the first optical lens 110. Refractive indices can be determined at a wavelength of about 550 nm (e.g., 550 nm, or 533 nm, or 587.6 nm), except where indicated differently. The index matching layer 165 can be included to reduce interface reflections and can be an adhesive, for example, as described elsewhere or can be an index matching oil, for example.

An anti-reflection coating may optionally be included at any interface or major surface of the optical system to reduce undesired reflections from the interface or major surface. Suitable anti-reflection coatings are known in the art and may include an index matching coating or one or more interference layers (e.g., a quarter-wave anti-reflection coating), for example.

Figure 4:
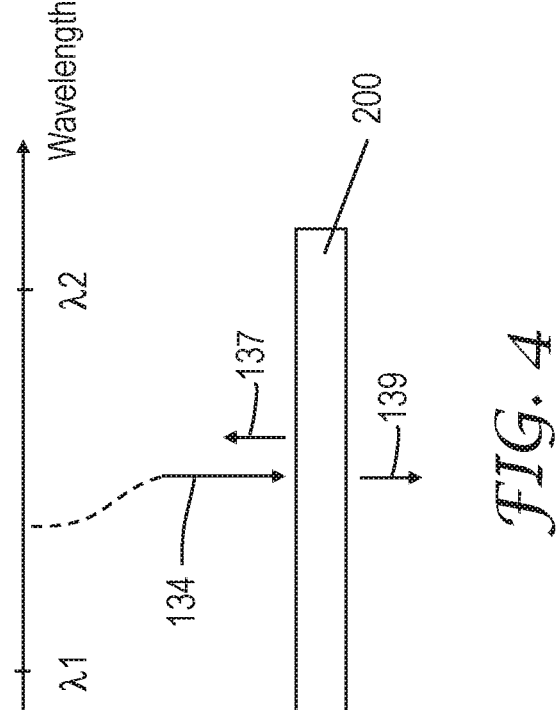
FIG. 4 is a schematic illustration of light substantially normally incident on an optical element.

FIG. 4 is a schematic cross-sectional view of a light 134 substantially normally incident (e.g., within about 30 degrees, or within about 20 degrees, or within about 10 degrees of normally incident, or nominally normally incident) on an optical element 200 which may correspond to the reflective polarizer 130 or to the partial reflector 140, for example. Light 134 is reflected and transmitted as respective reflected and transmitted lights 137 and 139. Light 134 may be unpolarized. In the case where the optical element 200 is a reflective polarizer, the reflected light 137 can be in the first polarization state 331 and the transmitted light 139 can be in the second polarization state 332. In the case where the optical element 200 is a partial reflector, the reflected and transmitted lights 137 and 139 may each be unpolarized. The light 134 has a wavelength in a predetermined wavelength range of $\lambda 1$ to $\lambda 2$. In some embodiments, $\lambda 1$ is about 400 nm, or about 420 nm, or about 450 nm, for example. In some such embodiments, or in other embodiments, $\lambda 2$ is about 700 nm, or about 680 nm, or about 650 nm, for example. The schematically illustrated reflected and transmitted lights 137 and 139 may represent average reflectance and transmittance in the predetermined wavelength range of $\lambda 1$ to $\lambda 2$.

In some embodiments, the reflective polarizer 130 substantially reflects light having a first polarization state 331 in a predetermined wavelength range and substantially transmits light having an orthogonal second polarization state 332 in the predetermined wavelength range. Substantially reflecting can be understood to mean reflecting at least 60% of incident light having the first polarization state in the predetermined wavelength range and substantially transmitting can be understood to mean a transmitting at least 60% of incident light having the second polarization state in the predetermined wavelength range. In some embodiments, the reflective polarizer 70 reflects at least 70% of light having the first polarization state and transmits at least 70% of light having the second polarization state in the predetermined wavelength range. In some embodiments, for substantially normally incident light 134, the reflective polarizer 130 has an average optical reflectance in the predetermined wavelength range of at least 70% for the first polarization state 331 and an average optical transmittance in the predetermined wavelength range of least 70% for the second polarization state 332. Suitable reflective polarizers include polymeric multilayer optical film reflective polarizers. Multilayer optical films and methods of making multilayer optical films are described in U.S. Pat. No. 5,882,774 (Jonza et al.); 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example. Suitable reflective polarizers include Dual Brightness Enhancement Film (DBEF) and Advanced Polarizing Film (APF), both available from 3M Company, St. Paul, MN. In some embodiments, the reflective polarizer 130 is substantially uniaxially oriented as described in U.S. Pat. No. 6,916,440 (Jackson et al.) and U.S. Pat. No. 10,678,052 (Ouderkirk et al.), for example.

In some embodiments, the partial reflector 140 has an average optical reflectance and an average optical transmittance for substantially normally incident light 134 in the predetermined wavelength range that are each in a range of 20% to 80%, or in a range of 30% to 70%, or in a range of 40% to 60%, or in a range of 45% to 55%. The partial reflector 140 may be a half mirror, for example. In some embodiments, the partial reflector 140 includes a metal. For example, the partial reflector 140 may be constructed by coating a thin layer of a metal (e.g., silver or aluminum) on a transparent substrate (e.g., a film which may then be adhered to a lens, or the transparent substrate may be a lens). The partial reflector may also be formed by depositing thin-film dielectric coatings onto a surface of a lens substrate, or by depositing a combination of metallic and dielectric coatings on the surface, for example.

An optical retardance generally has a magnitude and a principal axis orientation which can be represented by an angle between one of a fast axis and a slow axis of the retardance and a fixed direction. A value of retardance in units of length refers to the magnitude of the retardance. The retardance can be determined at a wavelength of about 550 nm (e.g., 550 nm, or 533 nm, or 587.6 nm), except where indicated differently. A retardance is substantially nonuniform when its magnitude is substantially nonuniform (e.g., the magnitude may vary spatially such that a maximum retardance may be greater than a minimum retardance by at least about 25%, or at least about 30%, or at least about 40%) or when its principal axis orientation is substantially nonuniform (e.g., the orientation may vary spatially such that a difference between maximum and minimum orientation for a same principle axis greater than about 30 degrees, or greater than about 40 degrees, or greater than about 45 degrees). A retardance is substantially uniform when its magnitude is substantially uniform (e.g., any spatial variation in the magnitude may be such that a maximum retardance may be greater than a minimum retardance by less than about 20%, or less than about 15%, or less than about 10%, or less than about 5%) and its principal axis orientation is substantially uniform (e.g., any spatial variation in the orientation may be such that a difference between maximum and minimum orientation of a same principle axis may be less than about 25 degrees, or less than about 20 degrees, or less than about 15 degrees, where the sample principle axis may be the slow axis or the fast axis).

Figure 5:
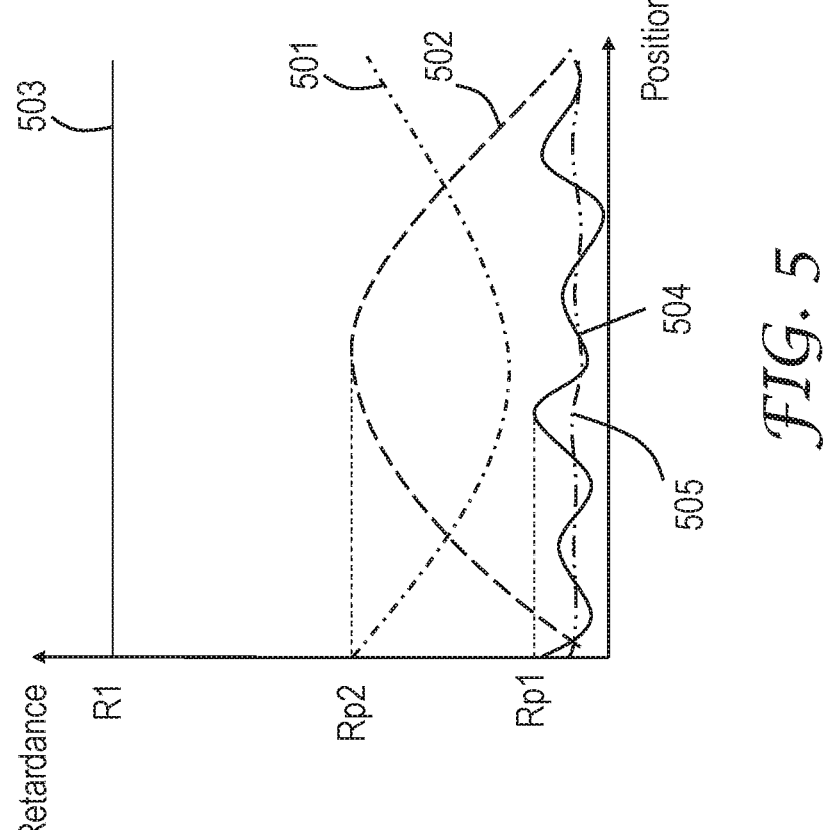
FIG. 5 is a schematic plot of a magnitude of optical retardance versus position for various optical components, according to some embodiments.
Figure 6:
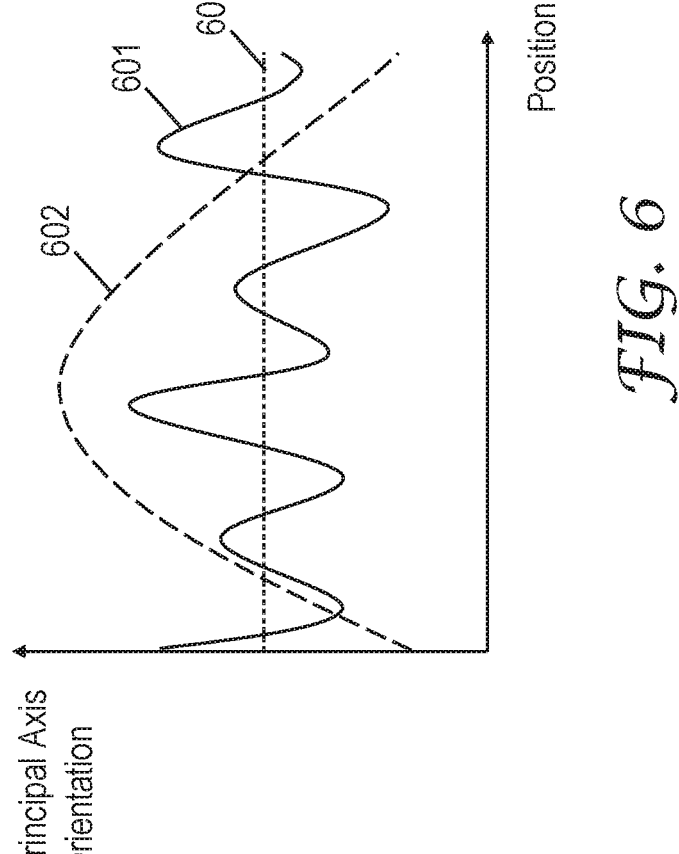
FIG. 6 is a schematic plot of principal axis orientation of optical retardance versus position for various optical components, according to some embodiments.

FIG. 5 is a schematic plot of a magnitude of optical retardance versus position for various optical components, according to some embodiments. FIG. 6 is a schematic plot of principal axis orientation of optical retardance versus position for various optical components, according to some embodiments. The retardance of an optical component (e.g., an optical lens) can be measured for light substantially normally incident on a major surface of the optical component and the position can refer to the location on the major surface where the light is incident. The incident location may be restricted to those locations resulting in the incident light being transmitted only through the optically active region of the optical lens (e.g., such that the optical path of the incident light does not extend through any portion of the optical lens outside the optically active region between the incident location and a detector). The retardances 501 and 502 are substantially nonuniform and have a maximum retardance Rp2 which may be greater than about 12 nm, or greater than about 14 nm, or greater than about 15 nm, or greater than about 16 nm, or greater than about 17 nm, or greater than about 19 nm, or greater than about 22 nm, or greater than about 24 nm, for example. The maximum retardance Rp2 may be up to about 40 nm or up to about 35 nm, for example. The retardances 501 and 502 may be for injection molded optical lenses where the retardance can be higher or lower in a central region of the optical lens depending on the mold used to make the optical lens (e.g., the birefringence can be higher closer to an input gate of the mold and lower farther from the input gate). The retardance 501 or 502 may be the retardance of the second optical lens 120, for example. The retardance 503 has a substantially uniform magnitude having a value R1 which may be substantially greater than the maximum retardance Rp2. The retardance 503 may be the retardance of a retarder, for example. The retardance 504 has a low and substantially nonuniform magnitude. The retardance 504 has a maximum of Rp1 which may be less than about 10 nm, or less than about 9 nm, or less than about 8 nm, or less than about 7 nm, or less than about 6 nm, or less than about 5.5 nm, for example. The maximum retardance Rp1 may be as low as about 1 nm or about 2 nm, for example. The retardance 505 has a low and substantially uniform magnitude. The retardance 504 or 505 may be the retardance of the first optical lens 110, for example.

The principal axis orientations 601 and 602 schematically illustrated in FIG. 6 are substantially nonuniform and may correspond to the principal axis orientation of a glass lens and a molded lens, respectively. The principal axis orientations 601 and 602 may be the principal axis orientations of the respective first and second optical lenses 110 and 120, for example. The principal axis orientation 603 is substantially uniform and may correspond to the principal axis orientation of a retarder, for example.

In some embodiments, the first optical lens 110 has a maximum retardance (e.g., Rp1) in a largest active region 111 of the first optical lens 110 of less than about 10 nm, or less than about 9 nm, or less than about 8 nm, or less than about 7 nm, or less than about 6 nm, or less than about 5.5 nm, or less than about 5 nm, for example. In some such embodiments, or in other embodiments, the second optical lens 120 has a maximum retardance (e.g., Rp2) in the largest active region 121 of the second optical lens 120 that is, for example, at least about 2 nm, or at least about 3 nm, or at least about 4 nm, or at least about 5 nm, or at least about 6 nm, or at least about 7 nm, or at least about 8 nm, or at least about 10 nm, or at least about 12 nm greater than the maximum retardance in the largest active region 111 of the first optical lens 110. In some such embodiments, or in other embodiments, the maximum retardance in the largest active region 121 of the second optical lens 120 is greater than about 12 nm, or greater than about 14 nm, or greater than about 15 nm, or greater than about 16 nm, or greater than about 17 nm, or greater than about 19 nm, or greater than about 22 nm, or greater than about 24 nm, for example.

In some embodiments, the optical system 100, 100', or 100" includes first and second optical lenses 110 and 120 where the first optical lens 110 has a first major surface 112 facing the second optical lens 120 and an opposite second major surface 114. In some embodiments, the second optical lens 120 has a first major surface 122 and an opposite second major surface 124 facing and concave towards the first optical lens 110. The first and second optical lenses 110 and 120 can have respective first and second maximum optical retardances in largest active regions 111 and 121 of the respective first and second optical lenses 110 and 120. In some embodiments, the first maximum retardance (e.g., Rp1 depicted in FIG. 5) is less than about 10 nm and the second maximum retardance (e.g., Rp2 depicted in FIG. 5) is at least about 2 nm greater than the first maximum retardance. In some embodiments, the second maximum retardance is, for example, at least about 3 nm, or at least about 4 nm, or at least about 5 nm, or at least about 6 nm, or at least about 7 nm greater than the first maximum retardance. In some embodiments, the first maximum retardance is less than about 9 nm, or less than about 8 nm, or less than about 7 nm, or less than about 6 nm, for example. In some embodiments, the second maximum retardance is greater than about 10 nm, or greater than about 12 nm, or greater than about 15 nm, or greater than about 16 nm, or greater than about 17 nm, for example. The optical system 100, 100', 100" can include a reflective polarizer 130 disposed on and conforming to the second major surface 124 of the second optical lens 120 and a partial reflector 140 disposed on the second major surface 114 of the first optical lens 110. The optical system 100, 100', 100" can further include a display 160, where the second optical lens 120 is disposed between the display 160 and the first optical lens 110 with the first major surface 122 of the second optical lens 120 facing the display 160.

The first and/or second optical lenses 110, 120 may have retardances as described elsewhere herein. Alternately, or in addition, the optical lenses may be characterized by the optical birefringence of the lenses. The optical birefringence may have a magnitude and principle axis orientation having the same general shapes as the curves shown in FIGS. 5-6. In some embodiments, the first optical lens 110 has a birefringence throughout the largest active region 111 of less than about 15 nm/cm, or less than about 10 nm/cm, or less than about 8 nm/cm, or less than about 7 nm/cm, or less than about 6 nm/cm, for example. In some embodiments, the second optical lens 120 has a maximum birefringence in the largest active region 121 of greater than about 15 nm/cm, or greater than about 17 nm/cm, or greater than about 18 nm/cm, or greater than about 19 nm/cm, or greater than about 20 nm/cm, for example. In some embodiments, a maximum birefringence of the largest active region 121 of the second optical lens 120 is greater than a maximum birefringence of the largest active region 111 of the first optical lens 110 by at least about 3 nm/cm, or at least about 5 nm/cm, or at least about 6 nm/cm, or at least about 7 nm/cm, for example.

Suitable materials for the first lens 110 include, for example, glasses such as borosilicate BK7 glass, lanthanum crown LAK34 glass, lanthanum flint LAF7 glass, flint F2 glass, dense flint SF2 glass, lanthanum dense flint LASF45 glass, fluorophosphate FPL51 glass, and fluorophosphate FPL55 glass, for example. Other suitable glasses are known in the art and may include those described in U.S. Pat. Appl. No. 2019/0384045 (Yun et al.), for example. A glass lens can have a low retardance but in some cases may have a nonuniform birefringence orientation. Other suitable materials for the first lens 110 includes annealed plastic such as annealed polymethylmethacrylate (PMMA). Annealing a lens formed by molding PMMA, for example, can result in a low retardance lens. It has been found at an initial retardance as high as about 50 nm, for example, can be reduced to about 5 nm or less by annealing. The annealing can be carried out at a temperature above the glass transition temperature of the lens material but below a melting point of the lens material.

Since the second optical lens 120 is disposed outside the optical cavity 150, a wider range of material choices are available for the optical lens 120 than would be the case if it were disposed in the optical cavity. In some embodiments, the second optical lens 120 has a higher index of refraction than PMMA (refractive index of 1.49) or cyclic olefin copolymer (COC, refractive index of 1.53) which are commonly used polymers for optical lenses. For example, the second optical lens 120 can have an index of refraction of greater than about 1.57, or greater than about 1.59, or greater than about 1.61, or greater than about 1.63, or greater than about 1.65 at a wavelength of about 550 nm. The refractive index may be up to about 1.8, for example. A high refractive index can be achieved by selecting a polymer with a high refractive index and/or by including high index nanoparticles dispersed in the polymer. Using a higher index material than PMMA allows a reduction of the lens curvature needed to give the same focusing power and this allows lens to be thinner. In some embodiments, the second optical lens 120 includes or is formed from at least one of polycarbonate, polystyrene, polyester, amorphous polyolefin (APO), or styrene methyl methacrylate (SMMA). Polycarbonate is less expensive that PMMA and COC and is easier to process than COC. Thus, polycarbonate can result in a less expensive lens than a lens made using the conventional lens materials PMMA or COC. Polycarbonate or polyester may also result in improved bonding to the reflective polarizer 130 in embodiments where the reflective polarizer is a multilayer polymeric film compared to PMMA or COC. In some embodiments, the second optical lens 120 is insert molded directly onto the reflective polarizer 130. Suitable molding processes are known in the art and may include those described in U.S. Pat. Appl. Pub. No. 2020/0081234 (Etter et al.) or in International Appl. Pub. No. WO 2019/079033 (Ambur et al.), for example. In some embodiments, the second optical lens 120 is formed directly on the reflective polarizer 130 where the reflective polarizer 130 includes a plurality of birefringent layers (e.g., the reflective polarizer can include a plurality of alternating birefringent and substantially isotropic layers) and where the second optical lens 120 has a glass transition temperature higher than a glass transition temperatures of the birefringent layers.

In some embodiments, one or both of the first and second optical lenses 110 and 120 are compound lenses. In some embodiments, one or both of the first and second optical lenses 110 and 120 are monolithic lenses. In some embodiments, at least one of one of the first and second optical lenses 110 and 120 includes a glass lens having a spherical major surface and a polymeric layer having a major surface conforming to the spherical major surface and having an opposite aspherical major surface. Such a polymeric layer may be molded onto the glass lens, for example. In the case of the first optical lens 110, the resulting aspherical lens can be annealed to reduce the birefringence in the polymer layer.

Figure 7:
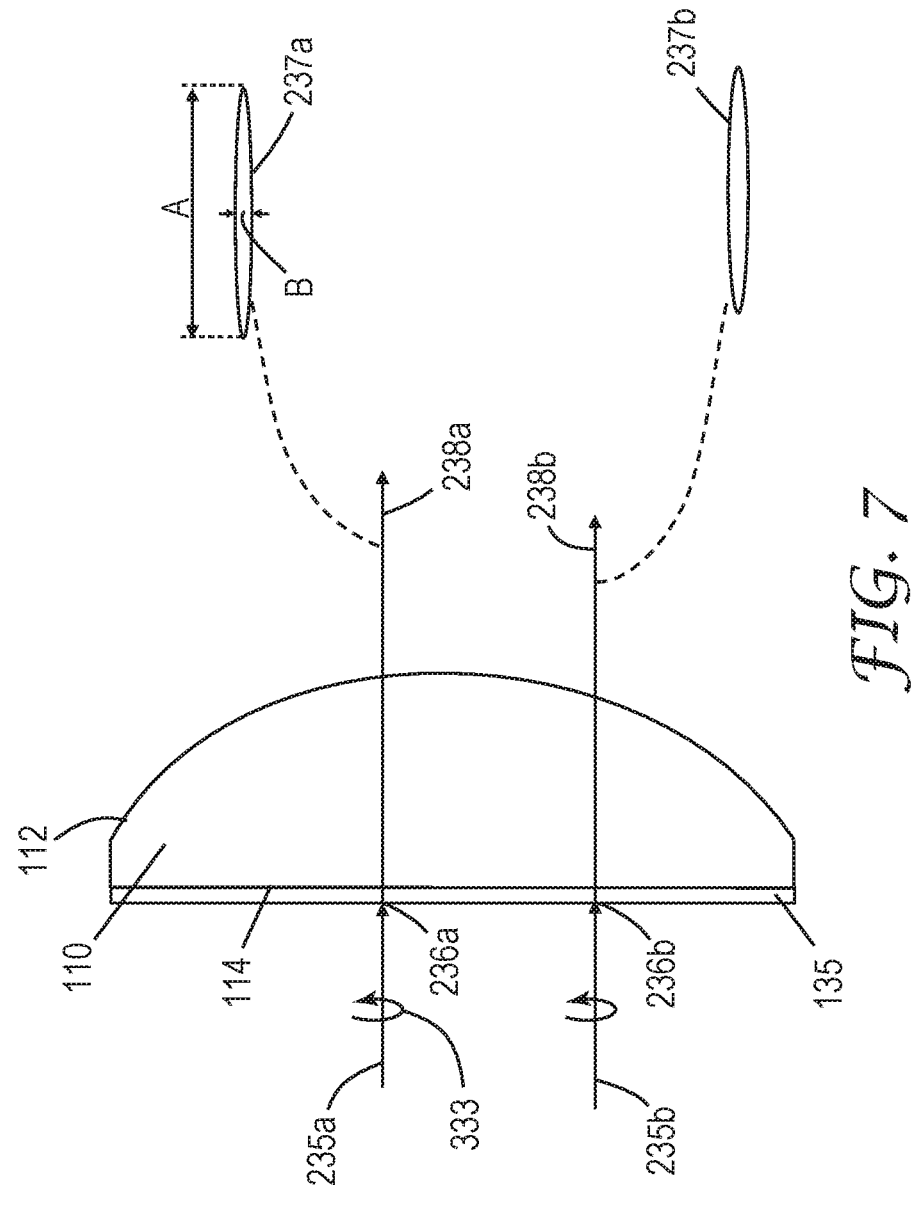
FIG. 7 is a schematic cross-sectional view of light incident on a retarder opposite an optical lens, according to some embodiments.
Figure 8:
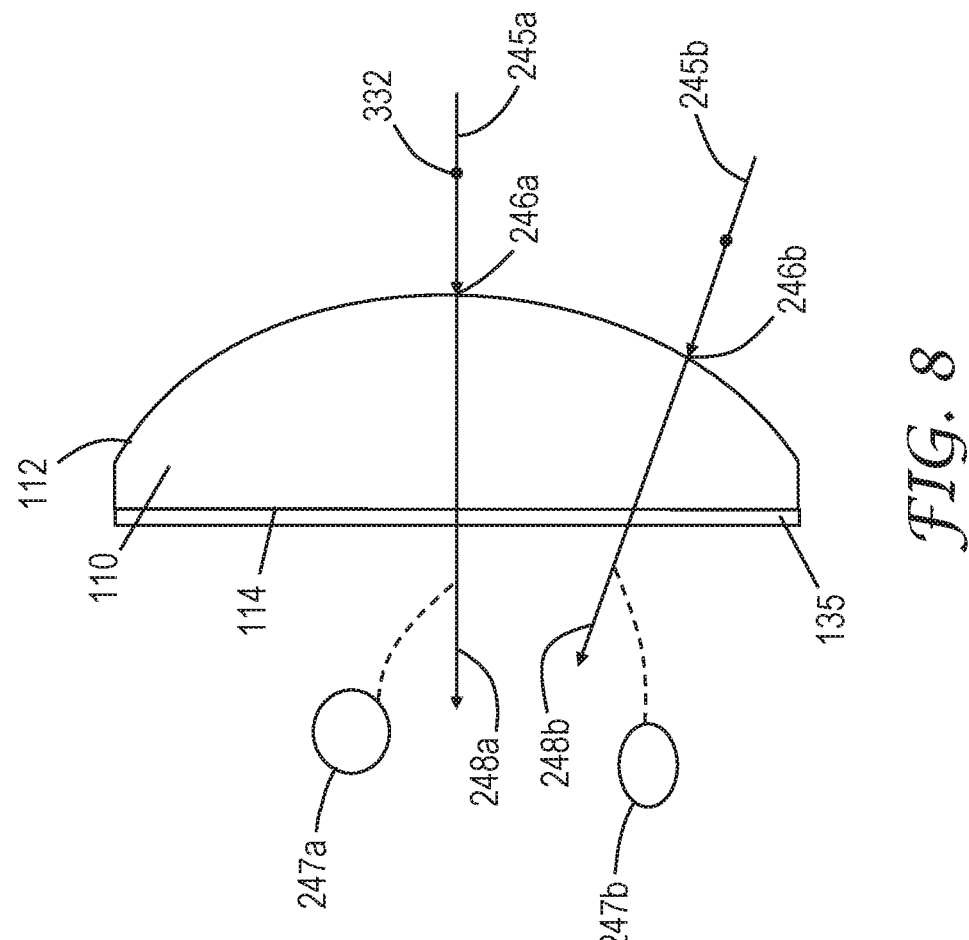
FIG. 8 is a schematic cross-sectional view of light incident on an optical lens opposite a retarder, according to some embodiments.
Figure 9:
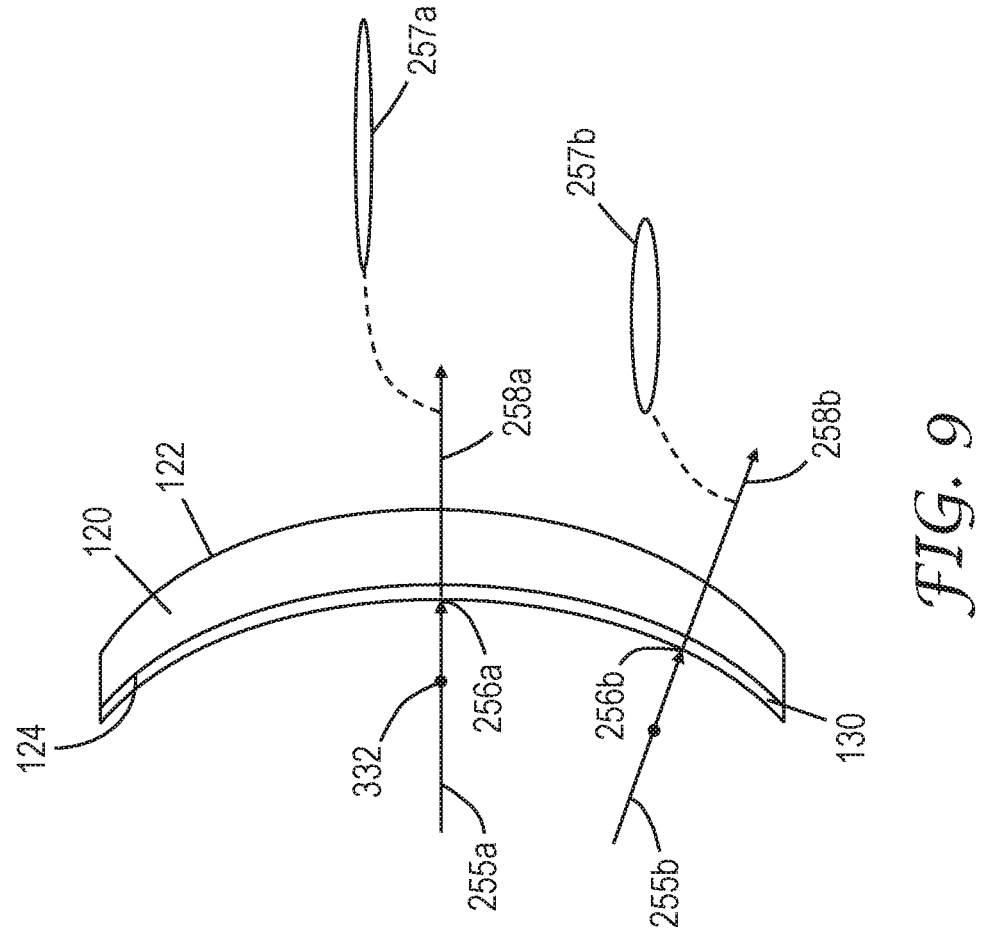
FIG. 9 is a schematic cross-sectional view of light incident on a reflective polarizer opposite an optical lens, according to some embodiments.
Figure 10:
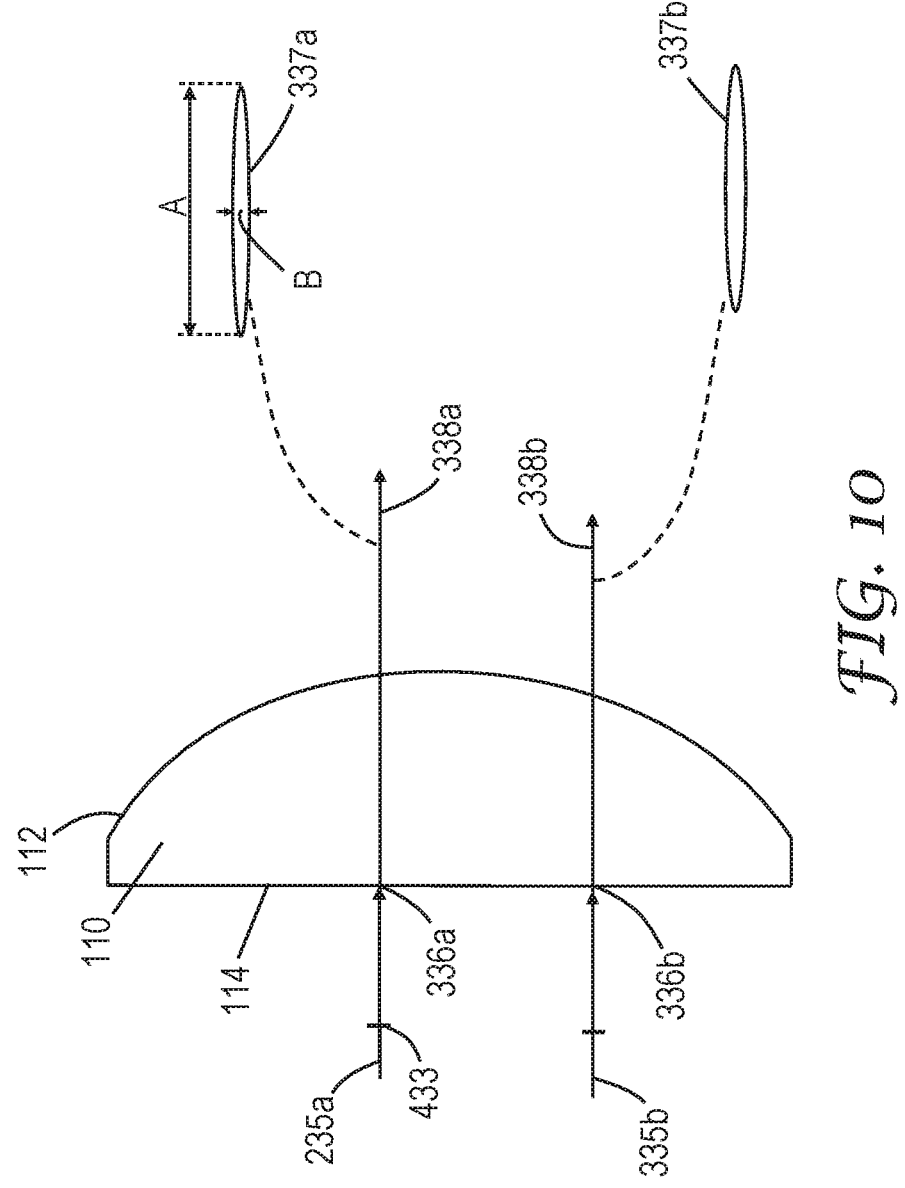
FIGS. 10-11 are schematic cross-sectional views of light incident on first and second optical lenses, according to some embodiments.
Figure 11:
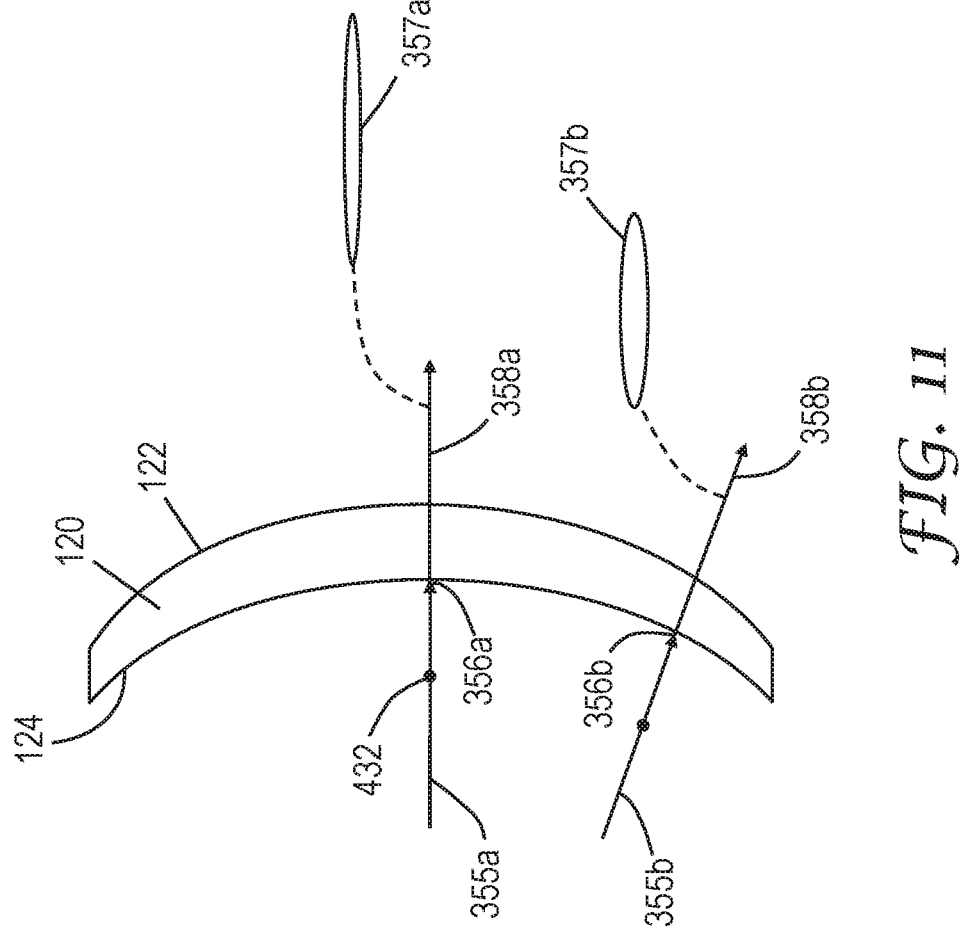
Figure 12:
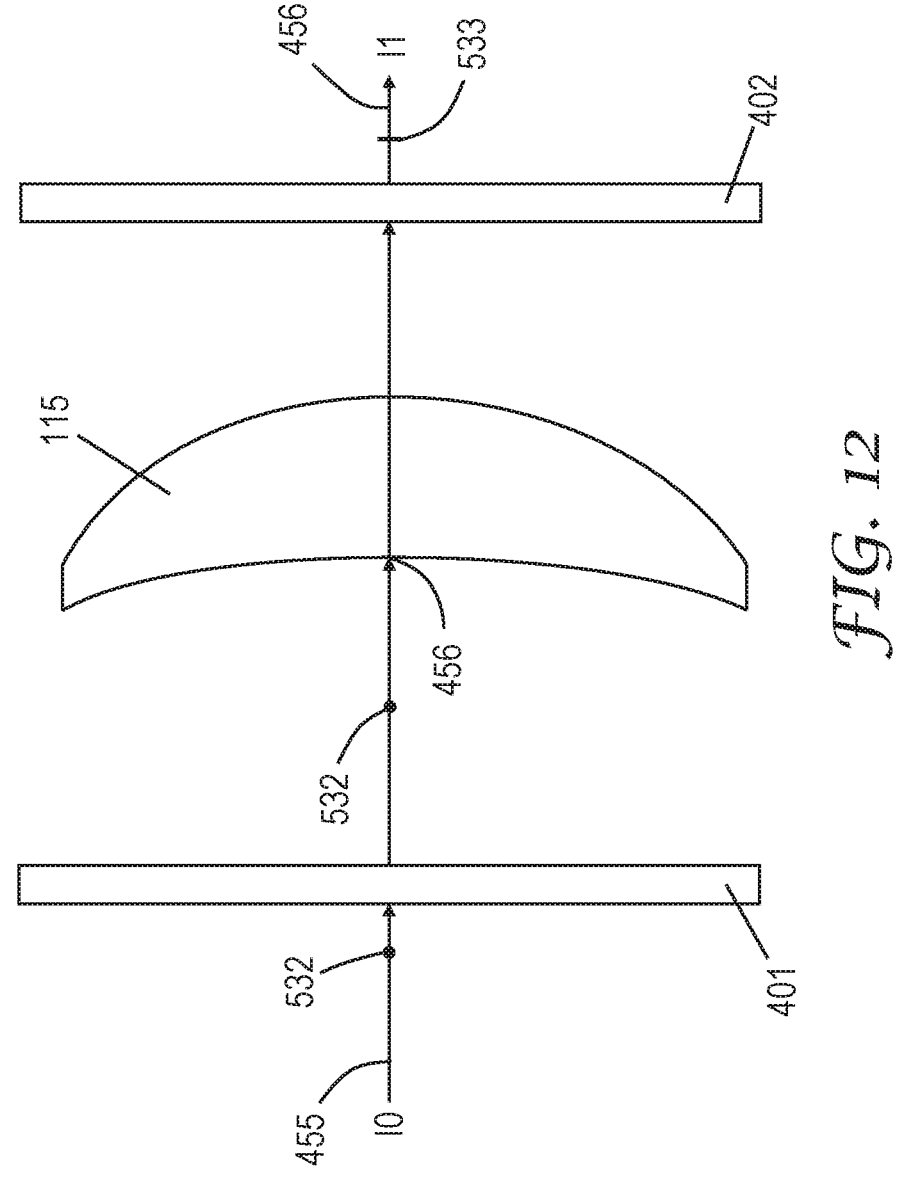
FIG. 12 is a schematic cross-sectional view of an illustrative optical lens disposed between crossed polarizers.

In some embodiments, as schematically illustrated in FIGS. 7-9, for example, the retardance of an optical lens having an optical element (e.g., a retarder or a reflective polarizer) disposed on a major surface thereof can be characterized by the polarization state of light transmitted through the optical lens and the optical element when the incident light has a predetermined polarization state. Alternatively, or in addition, as schematically illustrated in FIGS. 10-11, for example, the retardance of an optical lens (e.g., without an optical element disposed on a major surface thereof) can be characterized by the polarization state of light transmitted through the optical lens when the light incident on the optical lens has a predetermined polarization state. Alternatively, or in addition, as schematically illustrated in FIG. 12, for example, the retardance of an optical lens (e.g., without an optical element disposed on a major surface thereof) can be characterized by the transmission through the optical lens disposed between crossed linear polarizers.

FIG. 7 is a schematic cross-sectional view of the first optical lens 110 and the retarder 135 schematically illustrating a degree of linear polarization of transmitted light when light having a circular polarization state 333 is substantially normally incident on the retarder 135. In the illustrated embodiment, light is first incident on the first optical lens 110 on the second major surface 114 after passing through the retarder 135. In other embodiments, the retarder is disposed of the first major surface 112 and light is first incident on the first optical lens 110 on the first major surface 112 after passing through the retarder 135. In some embodiments, for a circularly polarized light 235a, 235b substantially normally incident on a side of the retarder 135 opposite the first optical lens 110 at an incident location 236a, 236b, and for each incident location such that the light is transmitted through a largest active region 111 (see, e.g., FIG. 1) of the first optical lens 110 without being transmitted through any portion of the first optical lens 110 outside the largest active region 111 of the first optical lens 110, a degree of linear polarization of the transmitted light 238a, 238b is greater than 0.95 or greater than 0.96, or greater than 0.97, or greater than 0.975. The degrees of linear polarization of the transmitted light 238a and 238b are schematically represented in FIG. 7 by polarization ellipses 237a and 237b.

The degree of linear polarization of a light is the ratio of the intensity of linear polarization of the light to the total intensity of the light and, similarly, the degree of circular polarization is the ratio of the intensity of circular polarization of the light to the total intensity of the light. As is known in the art, the degree of linear and circular polarization of a light can be expressed in terms of the Stokes parameters I. Q. U, and V (also referred to in the art as S0, S1, S2, and S3, respectively) of the light. The parameter I represents the total intensity of the light, Q represents the difference in intensity between light linearly polarized parallel to a reference plane relative and light linearly polarized perpendicular to the reference plane. U represents the difference in intensity between light linearly polarized +45 degrees relative to the reference plane and light polarized −45 degrees to the reference plane, and V represents the difference in intensity between right and left circularly polarized light. The degree of linear polarization can be expressed as $(Q^2+U^2)^{1/2}/I$ and the degree of circular polarization can be expressed as $|V|/I$. Stokes parameters are described in U.S. Pat. Appl. Pub. No. 2020/0379226 (Steiner et al.), for example. Alternatively, or in addition, when the degree of depolarization is negligible (e.g., less than about 0.03), the degree of linear and circular polarization can be expressed in terms of the major axis A and the minor axis B of the polarization ellipse: the degree of linear polarization may be expressed as $(A^2-B^2)/(A^2+B^2)$ and the degree of circular polarization may be expressed as $2AB/(A^2+B^2)$.

FIG. 8 is a schematic cross-sectional view of the first optical lens 110 and the retarder 135 schematically illustrating a degree of circular polarization of transmitted light when linearly polarized light is substantially normally incident on a side of the optical lens 110 opposite the retarder 135. In the illustrated embodiment, light is incident on first major surface 112. In other embodiments, the retarder is disposed of the first major surface 112 and light is incident on the second major surface 114. In some embodiments, for a light 245a, 245b having the second polarization state 332 substantially normally incident on a side of the first optical lens 110 opposite the retarder 135 at an incident location 246a, 246b, and for each incident location such that the light is transmitted through a largest active region 111 (sec, e.g., FIG. 1) of the first optical lens 110 and through the retarder 135 without being transmitted through any portion of the first optical lens 110 outside the largest active region 111 of the first optical lens 110, a degree of circular polarization of the transmitted light 248a, 248b is greater than 0.95 or greater than 0.96, or greater than 0.97, or greater than 0.975. The degrees of circular polarization of the transmitted light 248a and 248b are schematically represented in FIG. 8 by polarization ellipses 247a and 247b.

FIG. 9 is a schematic cross-sectional view of the second optical lens 120 and the reflective polarizer 130 schematically illustrating a degree of circular polarization of transmitted light when linearly polarized light is substantially normally incident on the reflective polarizer 130. In some embodiments, for a light 255b having the second polarization state 332 substantially normally incident on a side of the reflective polarizer 130 opposite the second optical lens 120 at a first incident location 256b such that the light is transmitted through the largest active region 121 (sec, e.g., FIG. 1) of the second optical lens 120 without being transmitted through any portion of the second optical lens 120 outside the largest active region 121 of the second optical lens 120, a degree of linear polarization of the transmitted light 258b is less than 0.95, or less than 0.94, or less than 0.93, or less than 0.92, or less than 0.91, or less than 0.9, or less than 0.89, or less than 0.88. In some such embodiments, or in other embodiments, for a light 255a having the second polarization state 332 substantially normally incident on a side of the reflective polarizer 130 opposite the second optical lens 120 at a second incident location 256a, different from the first incident location 256b, such that the light is transmitted through the largest active region 121 (see, e.g., FIG. 1) of the second optical lens 120 without being transmitted through any portion of the second optical lens 120 outside the largest active region 121 of the second optical lens 120, a degree of linear polarization of the transmitted light 258a is greater than 0.95, or greater than 0.96, or greater than 0.97, or greater than 0.975. There can be more than one first incident location such that the degree of linear polarization of the transmitted light is less than 0.95 or in another range described herein. Similarly, there can be more than one second incident location such that the degree of linear polarization of the transmitted light is greater than 0.95 or in another range described herein. The degrees of linear polarization of the transmitted light 258a and 258b are schematically represented in FIG. 9 by polarization ellipses 257a and 257b.

FIG. 10 is a schematic cross-sectional view of the first optical lens 110 schematically illustrating a degree of linear polarization of transmitted light when light having a linear polarization state 433 is substantially normally incident on a major surface of the optical lens 110. The linear polarization state 433 may be or correspond to the second polarization state 332 or the first polarization state 331 or may be a different polarization state. In the illustrated embodiment, light is first incident on the first optical lens 110 on the second major surface 114. In other embodiments, light is first incident on the first optical lens 110 on the first major surface 112. In some embodiments, for a linearly polarized light 335a, 335b substantially normally incident on a major surface the first optical lens 110 at an incident location 336a, 336b, and for each incident location such that the light is transmitted through a largest active region 111 (see. e.g., FIG. 1) of the first optical lens 110 without being transmitted through any portion of the first optical lens 110 outside the largest active region 111 of the first optical lens 110, a degree of linear polarization of the transmitted light 338a, 338b is greater than 0.95, or greater than 0.96, or greater than 0.97, or greater than 0.975. The degrees of linear polarization of the transmitted light 338a and 338b are schematically represented in FIG. 9 by polarization ellipses 337a and 337b.

FIG. 11 is a schematic cross-sectional view of the second optical lens 120 schematically illustrating a degree of circular polarization of transmitted light when linearly polarized light is substantially normally incident on a major surface of the optical lens 120. In some embodiments, for a light 355b having a linear polarization state 432 substantially normally incident on a major surface of the second optical lens 120 at a first incident location 356b such that the light is transmitted through the largest active region 121 (see, e.g., FIG. 1) of the second optical lens 120 without being transmitted through any portion of the second optical lens 120 outside the largest active region 121 of the second optical lens 120, a degree of linear polarization of the transmitted light 358b is less than 0.95, or less than 0.94, or less than 0.93, or less than 0.92, or less than 0.91, or less than 0.9, or less than 0.89, or less than 0.88. The linear polarization state 432 may be or correspond to second polarization state 332 or the first polarization state 331 or may be a different linear polarization state. In the illustrated embodiment, light is first incident on the second optical lens 120 on the second major surface 124. In other embodiments, light is first incident on the second optical lens 120 on the first major surface 122. In some such embodiments, or in other embodiments, for a light 355a having the linear polarization state 432 substantially normally incident on the major surface of the second optical lens 120 at a second incident location 356a, different from the first incident location 356b, such that the light is transmitted through the largest active region 121 (see, e.g., FIG. 1) of the second optical lens 120 without being transmitted through any portion of the second optical lens 120 outside the largest active region 121 of the second optical lens 120, a degree of linear polarization of the transmitted light 358a is greater than 0.95, or greater than 0.96, or greater than 0.97, or greater than 0.975. There can be more than one first incident location such that the degree of linear polarization of the transmitted light is less than 0.95 or in another range described herein. Similarly, there can be more than one second incident location such that the degree of linear polarization of the transmitted light is greater than 0.95 or in another range described herein. The degrees of linear polarization of the transmitted light 358a and 358b are schematically represented in FIG. 11 by polarization ellipses 357a and 357b.

FIG. 12 is a schematic cross-sectional view of an illustrative optical lens 115 disposed between crossed first and second linear polarizers 401 and 402. Crossed linear polarizers refer to polarizers disposed parallel to one another with pass polarization axes orthogonal to one another. First linear polarizer 401 has a first pass axis 532 and second linear polarizer 402 has a second pass axis 533. A light 455 polarized along the first pass axis 532 and having an intensity I0 is incident on the first linear polarizer 401 such that a portion of the light 455 is transmitted through the second linear polarizer 402 as light 456 having an intensity I1. If no elements were disposed between the crossed linear polarizers 401 and 402, the intensity I1 would be zero. However, the optical lens 115 can have some retardance which can result in a non-zero I1. The optical lens 115 may correspond to either of the optical lenses 110 or 120, for example. The first axis 532 may be along the second polarization state 332 or the first polarization state 331 or may be along a different polarization state.

In some embodiments, when the first optical lens 110 is disposed between crossed first and second linear polarizers 401 and 402 having respective mutually orthogonal first and second pass axes 532 and 533 and a light 455 polarized along the first pass axis 532 and having an intensity I0 is incident on the first linear polarizer 401 such that the light is transmitted through the first linear polarizer 401 and is incident on the first optical lens 401 at an incident location (e.g., corresponding to incident location 456 illustrated in FIG. 12), and for each incident location such that the light is transmitted through a largest active region 111 of the first optical lens 110 without being transmitted through any portion of the first optical lens outside the largest active region of the first optical lens, an intensity I1 of light 456 transmitted through the second linear polarizer 402 is less than about 0.008 I0, or less than about 0.006 I0, or less than about 0.004 I0, or less than about 0.003 I0, or less than about 0.0025 I0.

In some embodiments, when the second optical lens 120 is disposed between crossed first and second linear polarizers 401 and 402 having respective mutually orthogonal first and second pass axes 532 and 533 and a light 455 polarized along the first pass axis 532 and having an intensity I0 is incident on the first linear polarizer 401 such that the light is transmitted through the first linear polarizer and is incident on the second optical lens at an incident location (e.g., corresponding to incident location 456 illustrated in FIG. 12), and for at least one incident location such that the light is transmitted through a largest active region 121 of the second optical lens 120 without being transmitted through any portion of the second optical lens outside the largest active region of the second optical lens, an intensity of light transmitted through the second linear polarizer is greater than about 0.01 I0, or greater than about 0.015 I0, or greater than about 0.02 I0, or greater than about 0.025 I0.

Figure 13:
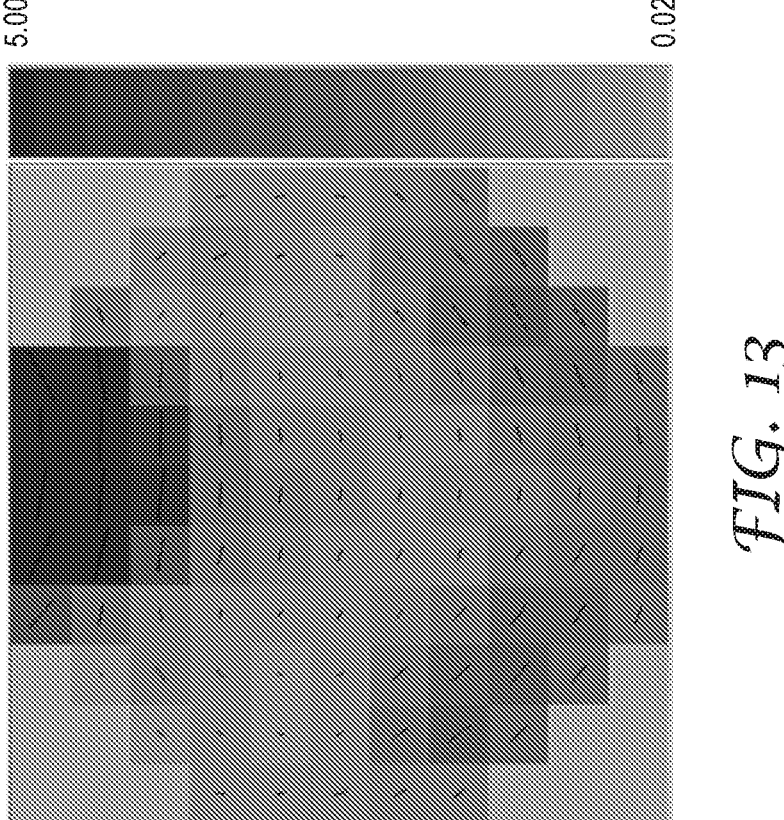
FIGS. 13-14 are retardance maps for optical lenses, according to some embodiments.
Figure 14:
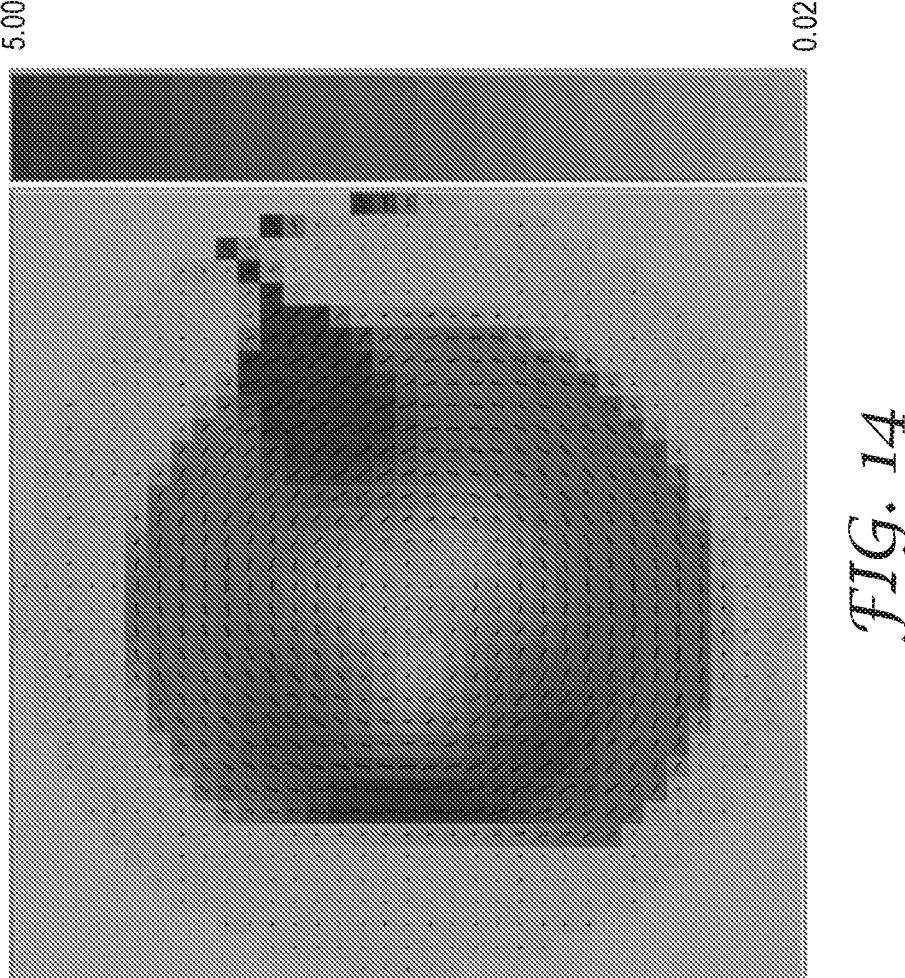

FIGS. 13-14 are retardance maps for a first optical lens 110 and a second optical lens 120, respectively, according to some embodiments. The lenses were injection molded PMMA (Optimas 7500 available form Mitsubishi Gas Chemical Company, Inc.) lenses and the first optical lens was thermally annealed to reduce birefringence. For optical systems according to some embodiments, is desired that the second optical lens 120 have low form error while the optical system may be more tolerant to form error for the first optical lens 110. Accordingly, the second optical lens 120 was molded with process conditions (e.g., pressure, temperature, time) to give good form, but such process conditions can also result in higher birefringence. The first optical lens 110 was molded with process conditions to give low birefringence. Such process conditions can give higher form error, but still within desired limits for the first optical lens 110, according to some embodiments. The retardance maps were determined using an AXOMETRICS AXOSCAN Muller Matric Polarimeter (AXOMETRICS, Inc., Huntsville, AL). The line segments in the figures represent the orientation of the retardance. The maximum retardance of the second optical lens 120 in an optically active region of the lens was about 30 nm. The maximum retardance of the first optical lens 110 in an optically active region of the lens was about 5 nm. Before annealing, the maximum retardance of the first optical lens 110 in an optically active region of the lens was about 15 nm.

Figure 15:
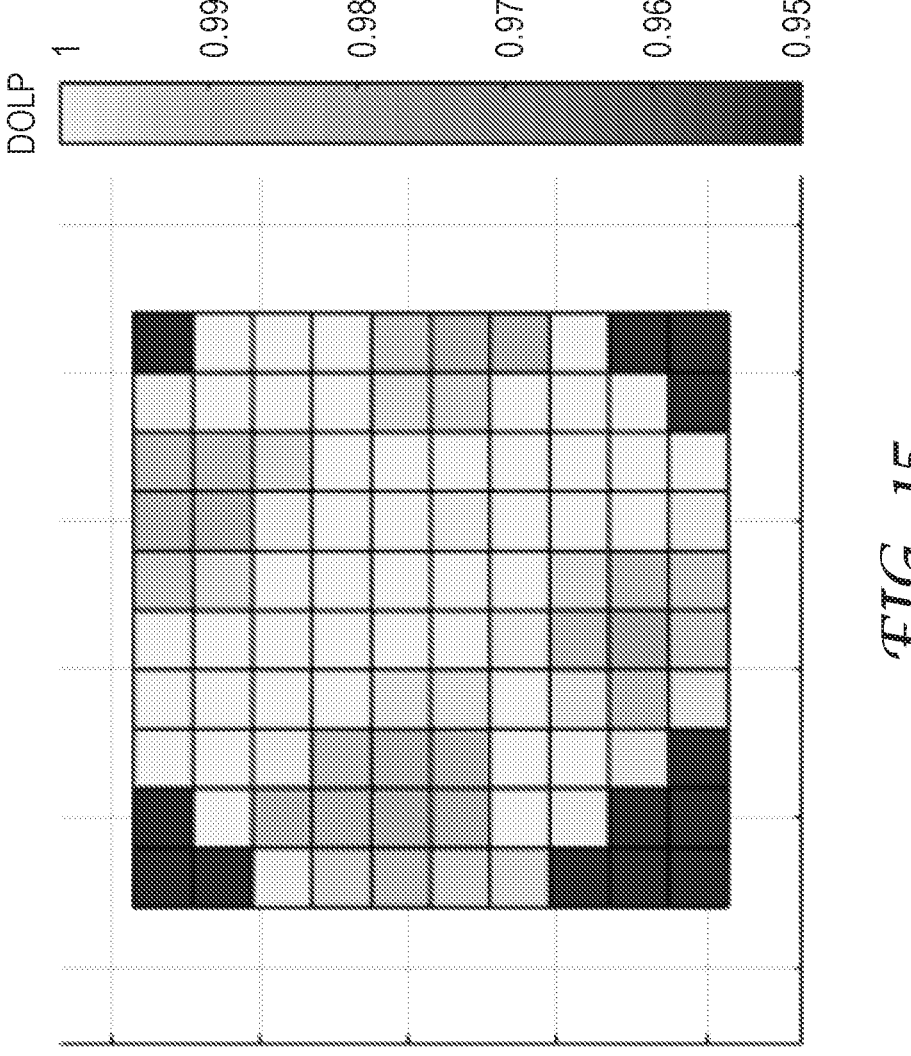
FIGS. 15-16 are plots of the degree of linear polarization of light transmitted through the optical lenses of FIGS. 13-14, respectively, when the incident light is linearly polarized.
Figure 16:
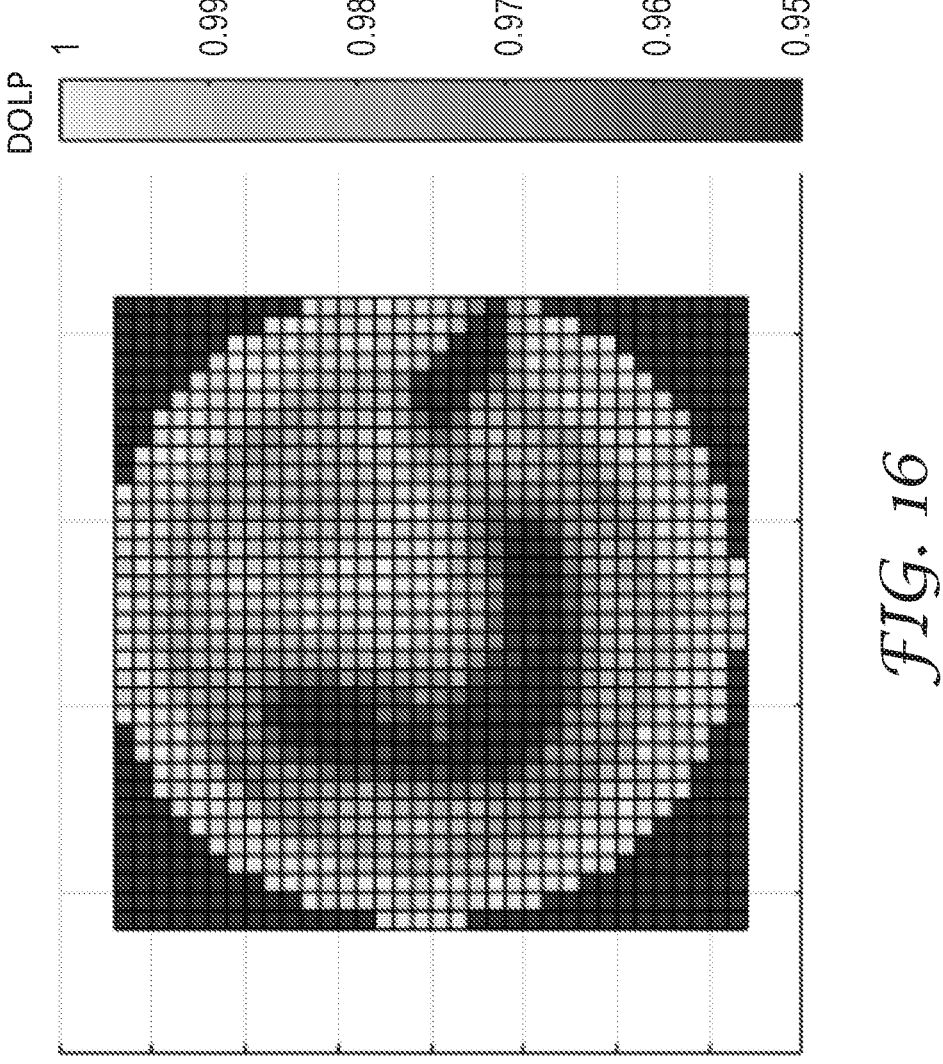

FIGS. 15-16 are plots of the degree of linear polarization (DOLP) of light transmitted through the optical lenses of FIGS. 13-14, respectively, when the incident light was linearly polarized. In FIG. 15, the degree of linear polarization was greater than 0.978 throughout the optically active region of the lens. In FIG. 15, the minimum degree of linear polarization in the optically active region of the lens was about 0.854.

Figure 17:
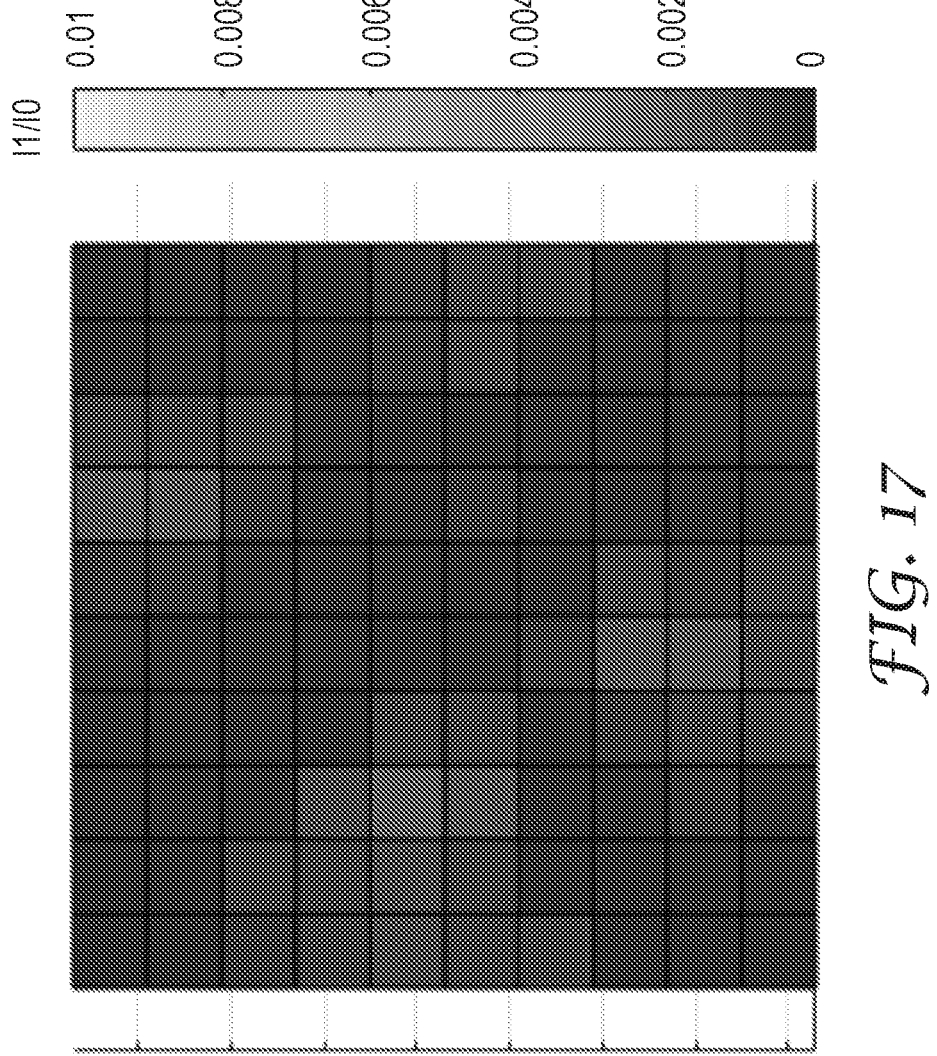
FIGS. 17-18 are plots of the normalized intensity of light passing through the optical lenses of FIGS. 13-14, respectively, when disposed between crossed polarizers with the incident light polarized along a pass axis of the first polarizer.
Figure 18:
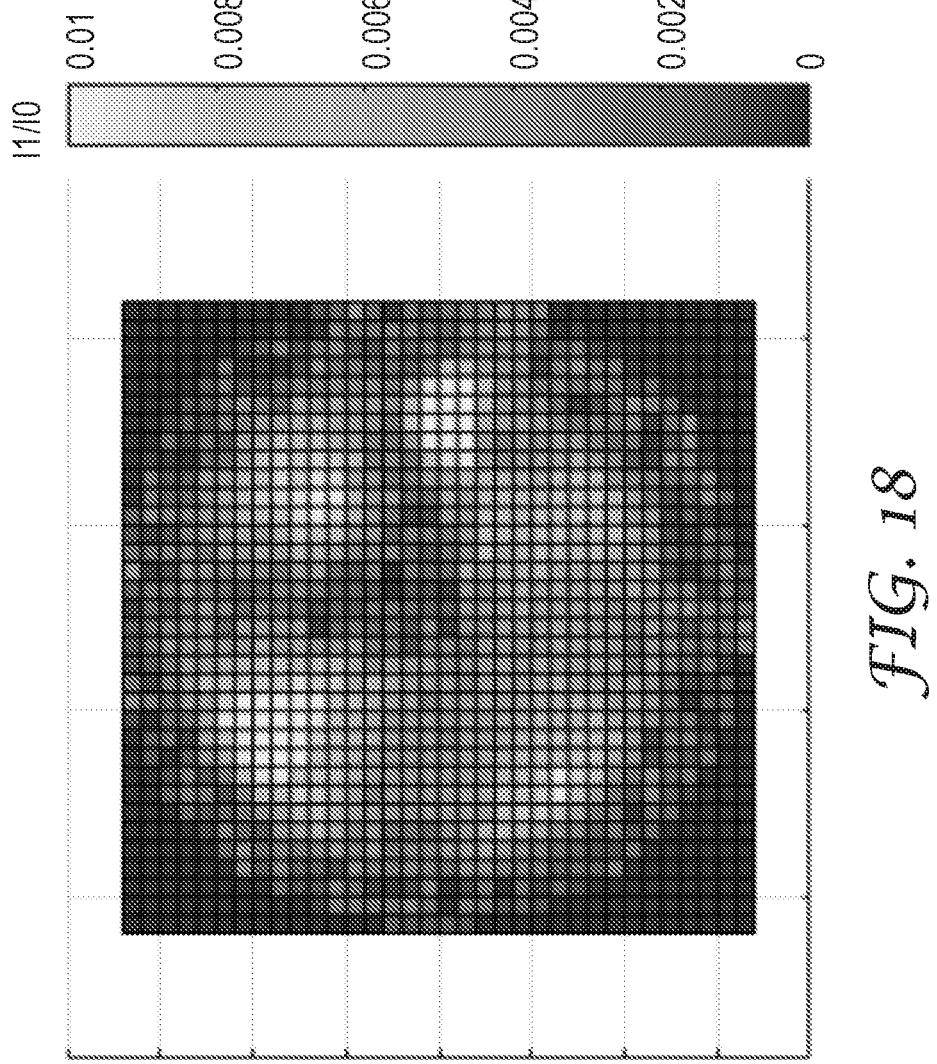

FIGS. 17-18 are plots of the intensity I1 (normalized by I0) of light passing through the optical lenses of FIGS. 13-14, respectively, when disposed between crossed polarizers with the incident light polarized along the pass axis of the first polarizer and having and intensity I0. In FIG. 17, the maximum intensity I1/I0 transmitted through the largest optically active region of the lens was about 0.002. In FIG. 17, the maximum intensity I1/I0 transmitted through the largest optically active region of the lens was about 0.0317.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. An optical system comprising:

an optical cavity defined by a reflective polarizer and a partial reflector, the reflective polarizer substantially reflecting light having a first polarization state in a predetermined wavelength range and substantially transmitting light having an orthogonal second polarization state in the predetermined wavelength range, the partial reflector having an average optical reflectance of at least 20% in the predetermined wavelength range, the optical cavity comprising one or more optical components including a first optical lens spaced apart from the reflective polarizer, each optical component within the optical cavity having a substantially uniform retardance or a maximum retardance of less than about 10 nm; and a second optical lens disposed outside the optical cavity, the reflective polarizer disposed on and conforming to a major surface of the second optical lens, the second optical lens having a substantially nonuniform retardance and a maximum retardance in a largest active region of the second optical lens of greater than about 12 nm, the second optical lens configured to face a display.

2. The optical system of claim 1, wherein the one or more optical components comprises a retarder disposed on a major surface of the first optical lens.

3. The optical system of claim 2, wherein for a circularly polarized light substantially normally incident on a side of the retarder opposite the first optical lens at an incident location, and for each incident location such that the light is transmitted through a largest active region of the first optical lens without being transmitted through any portion of the first optical lens outside the largest active region of the first optical lens, a degree of linear polarization of the transmitted light is greater than 0.95.

4. The optical system of claim 1, wherein for a linearly polarized light substantially normally incident on a major surface of the second optical lens at a first incident location such that the light is transmitted through the largest active region of the second optical lens without being transmitted through any portion of the second optical lens outside the largest active region of the second optical lens, a degree of linear polarization of the transmitted light is less than 0.93.

5. The optical system of claim 1, wherein when the first optical lens is disposed between crossed first and second linear polarizers having respective mutually orthogonal first and second pass axes and a light polarized along the first pass axis and having an intensity I0 is incident on the first linear polarizer such that the light is transmitted through the first linear polarizer and is incident on the first optical lens at an incident location, and for each incident location such that the light is transmitted through a largest active region of the first optical lens without being transmitted through any portion of the first optical lens outside the largest active region of the first optical lens, an intensity of light transmitted through the second linear polarizer is less than about 0.008 I0.

6. The optical system of claim 1, wherein when the first optical lens is disposed between crossed first and second linear polarizers having respective mutually orthogonal first and second pass axes and a light polarized along the first pass axis and having an intensity I0 is incident on the first linear polarizer such that the light is transmitted through the first linear polarizer and is incident on the second optical lens at an incident location, and for at least one incident location such that the light is transmitted through a largest active region of the second optical lens without being transmitted through any portion of the second optical lens outside the largest active region of the second optical lens, an intensity of light transmitted through the second linear polarizer is greater than about 0.01 I0.

7. The optical system of claim 1, wherein the first optical lens has a maximum retardance in a largest active region of the first optical lens of less than about 8 nm, and wherein the maximum retardance in the largest active region of the second optical lens is greater than about 14 nm.

8. The optical system of claim 1, wherein no optical lenses are disposed between the first and second optical lenses.

9. The optical system of claim 1 further comprising an absorbing linear polarizer, the partial reflector disposed between the absorbing linear polarizer and the first optical lens.

10. The optical system of claim 9, further comprising a retarder disposed between the absorbing linear polarizer and the partial reflector.

11. The optical system of claim 1, wherein the first and second optical lenses are bonded to one another through an adhesive layer disposed between the first optical lens and the reflective polarizer.

12. The optical system of claim 1, wherein the second optical lens comprises at least one of polycarbonate, polystyrene, polyester, amorphous polyolefin, or styrene methyl methacrylate.

13. An optical system comprising:
first and second optical lenses, the first optical lens comprising a first major surface facing the second optical lens and an opposite second major surface, the second optical lens comprising a first major surface and an opposite second major surface facing and concave towards the first optical lens, the first and second optical lenses having respective first and second maximum retardances in largest active regions of the respective first and second optical lenses, the first maximum retardance being less than about 10 nm, the second maximum retardance being at least about 2 nm greater than the first maximum retardance;
a reflective polarizer disposed on and conforming to the second major surface of the second optical lens, the reflective polarizer substantially reflecting light having a first polarization state in a predetermined wavelength range and substantially transmitting light having an orthogonal second polarization state in the predetermined wavelength range; and
a partial reflector disposed on the second major surface of the first optical lens, the partial reflector having an average optical reflectance of at least 20% in the predetermined wavelength range.

14. The optical system of claim 13 further comprising a display, the second optical lens disposed between the display and the first optical lens, the first major surface of the second optical lens facing the display.

15. The optical system of claim 13 further comprising a retarder disposed between the partial reflector and the first optical lens.

16. The optical system of claim 13, wherein no optical lenses are disposed between the first and second optical lenses.

17. The optical system of claim 13 further comprising an absorbing linear polarizer, the partial reflector disposed between the absorbing linear polarizer and the second major surface of the first optical lens.

18. The optical system of claim 17, further comprising a retarder disposed between the absorbing linear polarizer and the partial reflector.

19. The optical system of claim 13, wherein the first and second optical lenses are bonded to one another through an adhesive layer disposed between the first major surface of the first optical lens and the reflective polarizer.

20. The optical system of claim 13, wherein the second optical lens comprises at least one of polycarbonate, polystyrene, polyester, amorphous polyolefin, or styrene methyl methacrylate.

* * * * *